United States Patent [19]

Jones et al.

[11] Patent Number: 5,765,361
[45] Date of Patent: Jun. 16, 1998

[54] HYBRID-LO2-LH2 LOW COST LAUNCH VEHICLE

[76] Inventors: Herbert Stephen Jones. 61340 Kings Arms Dr., Lacombe, La. 70445; Harry Phillip Williams, P.O. Box 856, Folsom, La. 70437

[21] Appl. No.: 701,938

[22] Filed: Aug. 23, 1996

[51] Int. Cl.⁶ .................................................. F02K 9/28
[52] U.S. Cl. .................. 60/204; 60/251; 60/219; 60/256; 60/257
[58] Field of Search .................. 60/250, 251, 253, 60/257, 204, 219, 256

[56] References Cited

U.S. PATENT DOCUMENTS

| | | | |
|---|---|---|---|
| 2,711,630 | 6/1955 | Lehman | 60/250 |
| 3,093,960 | 6/1963 | Tyson, Jr. | 60/219 |
| 3,116,599 | 1/1964 | Campbell | 60/256 |
| 3,128,599 | 4/1964 | Carr | 60/251 |
| 3,136,119 | 6/1964 | Avery | 60/35.4 |
| 3,156,092 | 11/1964 | Holzman | 60/251 |
| 3,350,887 | 11/1967 | Leunig et al. | 60/251 |
| 3,613,583 | 10/1971 | Lai | 60/251 |
| 3,789,610 | 2/1974 | Stone | 60/251 |
| 3,791,140 | 2/1974 | Rudy et al. | 60/207 |
| 4,214,439 | 7/1980 | Browning et al. | 60/257 |
| 4,424,679 | 1/1984 | Holzman | 60/251 |
| 4,811,556 | 3/1989 | Lau et al. | 60/206 |
| 4,840,025 | 6/1989 | Coffinberry | 60/217 |
| 5,010,730 | 4/1991 | Knuth et al. | 60/251 |
| 5,099,645 | 3/1992 | Schuler et al. | 60/219 |
| 5,119,627 | 6/1992 | Bradford et al. | 60/251 |
| 5,172,875 | 12/1992 | Fried | 244/158 R |
| 5,339,625 | 8/1994 | McKinney et al. | 60/119 |
| 5,444,973 | 8/1995 | Limerick et al. | 60/257 |
| 5,572,864 | 11/1996 | Jones | 60/251 |
| 5,582,001 | 12/1996 | Bradford et al. | 60/251 |

*Primary Examiner*—Timothy Thorpe
*Assistant Examiner*—Ted Kim
*Attorney, Agent, or Firm*—W. H. Meise; S. A. Young

[57] ABSTRACT

A low-cost rocket or thruster has a low-cost propellant injector, in which fluid fuel and oxidizer are injected into a combustion chamber. The walls of the combustion chamber are protected from the high temperatures of the combustion by a grain of solid propellant, the surface of which tends to melt andor vaporize in the presence of combustion temperatures, and thereby protects the walls of the chamber. The low-cost propellant injector may not mix the fluid fuel and oxidizer effectively, so that pockets of noncombusted gas may occur within the chamber. The ratio of fluid fuel and oxidizer is selected to be slightly oxidizer-rich, so that any pockets of unburned gas tend to be oxygen-rich. When the pockets come into contact with the solid fuel, the excess oxygen combusts with the gaseous solid fuel, and when the mixture is near stoichiometric, the fluid fuel combusts. Thus, an inexpensive bipropellant injector together with a solid fuel grain simultaneously allows use of solid fuel instead of insulation to protect the combustion chamber walls, and the combustion is stabilized by the presence of the solid fuel. Ideally, the amount of excess oxidizer should be sufficient to completely combust the solid fuel. The preferred propellants are LO2 and LH2, and the preferred solid fuel is HTPB.

16 Claims, 2 Drawing Sheets

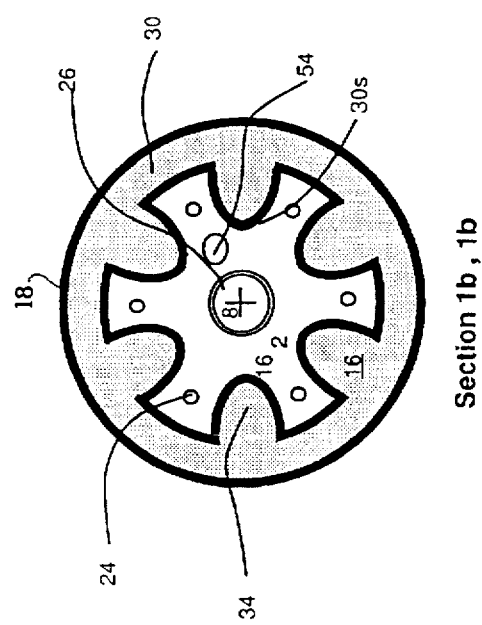
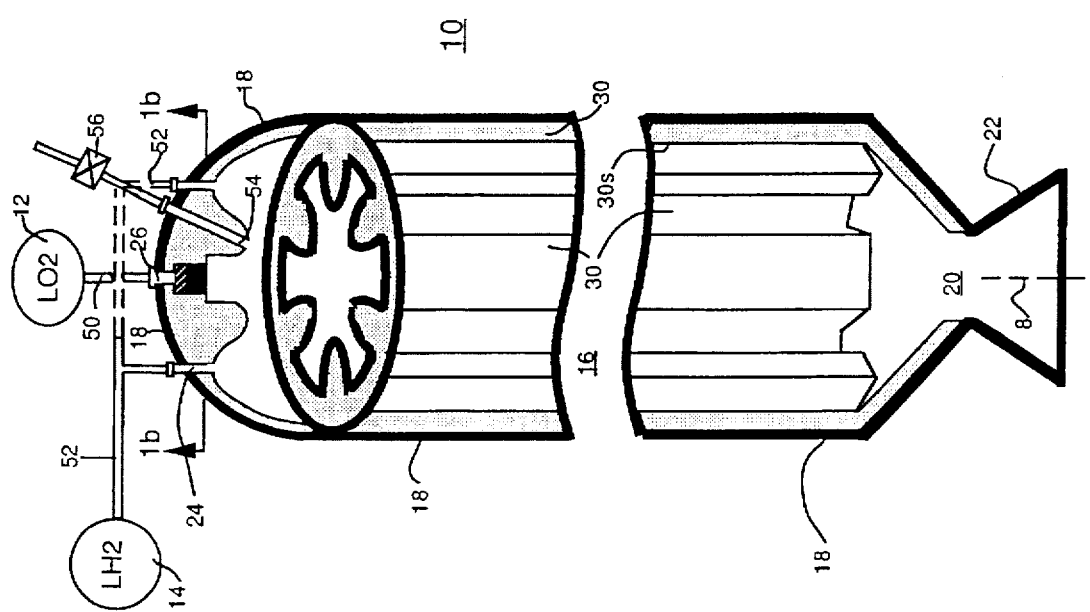

HYBRID-LO2-LH2 LOW COST LAUNCH VEHICLE

FIELD OF THE INVENTION

This invention relates to rocket engines, and more particularly to rocket engines which use both liquid and solid propellants.

BACKGROUND OF THE INVENTION

There has been a long-felt need for a low-cost method for boosting relatively lightweight or small spacecraft into Earth orbit. Three stages of rocket are normally required to take a payload into orbit. Single-stage to orbit schemes have been tried, but have not yet been commercially successful. There has been some philosophical discussion of using railgun technology for placing small spacecraft in orbit, but the technological problems are different from those of rocket boosters, and less well known.

High-performance rocket boosters generally require high-energy liquid propellants, such as liquid oxygen (LO2) as the oxidizer and liquid hydrogen (LH2) as the fuel. The propellants must be sprayed into a combustion chamber in a manner which is carefully controlled, to prevent combustion anomalies such as pulsation due to regions of incomplete mixing of the fuel and oxidizer, and so that the fuel is completely reacted. Any portion of the fuel which does not react is simply dead weight until it is expelled, and such unreacted fuel reduces the energy in the remaining portion of the rocket exhaust. Thus, in addition to providing thorough mixing of the fuel and oxidizer reactants, the propellant injection into the combustion chamber must provide complete reaction.

Another problem associated with LO2/LH2 rocket engines is that of protection of the walls of the combustion chamber from the heat generated by the combustion process. Weight limitations placed on the engine limit the mass of the walls of the combustion chamber, and as a result, the walls are susceptible to being locally melted or punctured by the reacting propellants. The problem of protecting the walls of the combustion chamber is ordinarily met by circulating liquid hydrogen propellant through a chamber or plenum surrounding the combustion chamber, and the liquid hydrogen absorbs heat from the walls of the combustion chamber, preventing damage during operation. Ablative materials have been considered for use in the combustion chamber to avoid the need for the cooling system, but it has been found that ablative materials ablate very quickly under the conditions found in the combustion chamber, and may be dissipated before operation of the rocket ceases, and it has also been found that the ablation itself tends to reduce the energy of the ejected mass, because of the energy required for the ablation.

The requirements placed on the combustion process require great accuracy in the relationship between the injection patterns of the fuel and oxidizer injectors, which are ordinarily met by the use of multipropellant injectors, in which a single assembly includes injectors for both fuel and oxidizer. Such multipropellant injectors are very expensive, and orders of magnitude more costly than single-propellant injectors.

An improved rocket engine is desired. It would be particularly desirable to have a rocket engine which may be used as the first stage or second stage, or both stages, of a two-stage-to-orbit vehicle.

SUMMARY OF THE INVENTION

A rocket engine according to the invention includes a source of liquid oxidizer and a source of combustible fluid propellant. The engine includes a chamber with walls and a combustion product ejection port, which may communicate with a thrust nozzle. A propellant injector is coupled to the source of combustible fluid propellant, for injecting the propellant into the chamber at a selected rate. An oxidizer injector is coupled to the source of liquid oxidizer and to the chamber, for injecting oxidizer into the chamber at a rate no less than a rate which is sufficient for complete combustion of the propellant. During operation, the propellant tends to combust within the chamber and to leave the chamber through the ejection port, for thereby creating thrust. The combustion may occur at a temperature sufficiently high that a wall or walls of the chamber may be damaged during operation of the rocket engine. The rocket engine includes a solid propellant liner within the chamber. The surface of the solid propellant liner which is adjacent the combustion tends to melt and then become gaseous in response to combustion of propellant in the chamber, thereby tending to absorb heat and to protect the wall from high combustion temperatures. In the process of becoming gaseous, the solid propellant combusts with any excess oxidizer, and adds to the thrust.

In a particular embodiment of the invention, the oxidizer supplied to the injector is liquid oxygen, the fluid propellant supplied to the injector is liquid hydrogen, and the solid propellant is HTPB. According to an aspect of the invention, the location of the oxidizer and fluid propellant injectors is less critical than in the prior art, and the injectors are separate injectors which inject the oxidizer and fluid propellant at different locations about the chamber.

In an embodiment of the invention, the solid-propellant liner is in the form of an elongated cylinder defining an axis, and a cavity extending along the axis. The cross-sectional shape of the cavity in a plane perpendicular to the longitudinal axis may be generally star-shaped, or circular with a plurality of lobes extending toward the walls of the chamber. In such an embodiment of the invention, the oxidizer is injected at a location lying on the longitudinal axis, and the fluid propellant is injected at a plurality of locations surrounding the location of the oxidizer injection, corresponding to the locations of the lobes in the cavity of the solid propellant.

A preferred method for operating a rocket engine according to the invention is to inject the fluid propellant at a selected rate, and to inject the oxidizer at a rate which exceeds the rate which provides complete combustion with the flux of fluid propellant, which then results in combustion of the solid propellant with the excess oxidizer.

In a most preferred embodiment of the invention, the fluid propellant is injected continuously during operation, and the combustion of the fluid propellant provides at least 75% of the thrust, or provides at least 75% of the change in velocity ($\Delta V$), with the remainder of the thrust being provided by combustion of the solid fuel and any incidental ignition devices.

BRIEF DESCRIPTION OF THE DRAWINGS

FIGURE 1*a* is a simplified cross-sectional representation of a rocket engine according to the invention, and FIGURE 1*b* is a cross-section of the engine of FIGURE 1*a* at section lines 1*b*—1*b*.

DETAILED DESCRIPTION OF THE INVENTION

Figure 2:
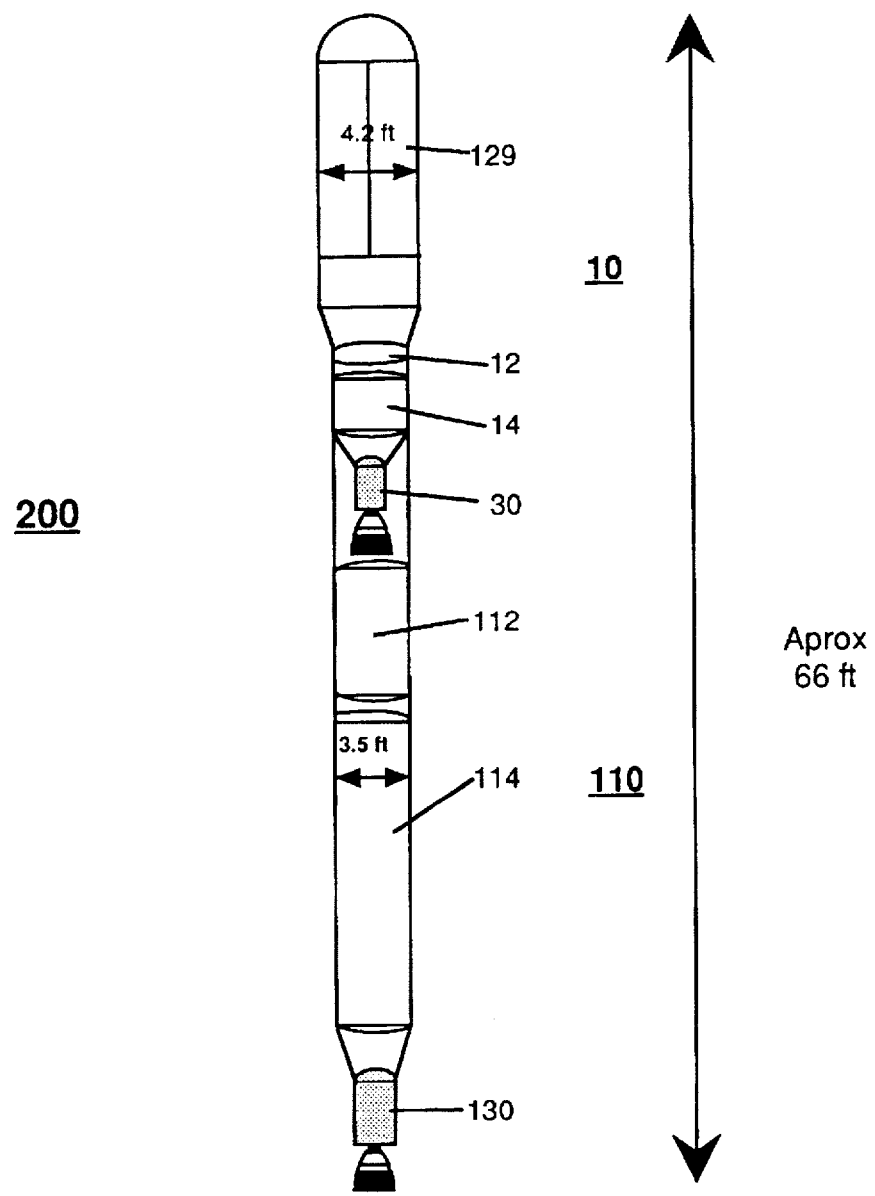
FIG. 2 is a simplified representation of a two-stage rocket with hybrid first and second stages according to the invention.

In FIGURES 1*a* and 1*b*, rocket engine 10 includes walls 18 which together define a chamber 16 which includes a cylindrical portion and a domed portion, and which also includes a mass flow exit port 20, all centered about a longitudinal axis 8. Port 20 may be connected to a nozzle illustrated as 22. A pipe 50 connects a tank or source 12 of liquid oxygen (LO2) to an oxygen injector 26 which extends through wall 18 into chamber 16. A pipe 52 connects a source 14 of liquid hydrogen (LH2) fuel to fuel injectors designated 24, which penetrate through walls 18 into the domed portion of chamber 16. The flow of liquid oxygen and liquid hydrogen through pipes 50 and 52, respectively, is controlled by valves, flow regulators, and/or pumps (none of which are illustrated), all in a conventional manner.

Within chamber 16 of FIGURES 1a and 1b, a liner 30 of solid rocket propellant covers all of the surfaces of walls 18 which would otherwise be exposed to chamber 16. This solid fuel is preferably Hydroxyl Terminated Polybutadiene (HTPB), which is a synthetic elastomer, the vapors of which react spontaneously with hot gaseous oxygen. The solid fuel 30 is generally in the form of a circular cylinder with a cap, dimensioned to fit within walls 18 of rocket engine 10 to partially occupy chamber 16. The capped circular cylinder 30 of solid fuel has an inner chamber $16_2$ defined by an inner surface 30s. The fluid propellants are injected, by injectors 24 and 26, and at selected flow rates, into inner chamber $16_2$ lying within chamber 16, and the injected propellants mix therein to form a combustible fluid mixture which, when ignited, reacts exothermically to generate reaction products, which leave exit port 20 as a mass flow which produces the desired thrust.

The mixture of gaseous hydrogen and oxygen propellants within the inner chamber $16_2$ of FIGURES 1a and 1b is readily ignited, and ignition of the injected propellants may be accomplished in any desired manner, as by an electric spark. The mixture of injected propellants is so highly reactive as to be explosive, and should not be allowed to accumulate in the combustion chamber if not actually reacting. In a preferred embodiment of the invention, ignition is guaranteed by a hybrid igniter engine, which is illustrated as 54. The use of auxiliary hybrid engines for starting main rocket engines is described in copending U.S. patent application Ser No. 08/308,036, filed Sep. 16, 1994 in the name of Jones, now U.S. Pat. No. 5,572,864, and the use of pyrophoric materials to aid in starting hybrid rocket engines is described in copending U.S. patent application Ser. No. 08/569,331, filed Dec. 6, 1995 in the name of Piekarski et al.

Igniter 54 of FIGURES 1a and 1b may be a hybrid engine containing HTPB solid fuel, which becomes active in the presence of gaseous oxygen. When ignition of the main engine is desired, gaseous oxygen is allowed to enter igniter engine 54 by way of a valve 56. The gaseous oxygen reacts with the solid fuel within the ignition engine 54, and engine 54 produces hot reaction products which are injected into chamber 16. Once igniter engine 54 is operating, fluid propellants can be allowed to enter chamber 16 by way of injectors 24 and 26.

When the fluid propellants enter chamber 16 of FIGURES 1a and 1b in the presence of hot reaction products from igniter engine 54, the propellants become gaseous. While the mixing together of the gaseous oxygen and the gaseous hydrogen may not be sufficiently complete at every point within the combustion chamber to sustain combustion at that point, the combustion cannot be extinguished, as in some prior-art arrangements, by pulses which may occur as pockets of propellants mix in the proper proportions. Instead, any pockets of unburned gaseous propellants may, in general, include both hydrogen and oxygen components. The hot gaseous oxygen component of the pocket of unburned gas is likely to come into contact with the inner surface 30s of the solid fuel liner 30, whereupon that oxygen will tend to react with the solid fuel at that location. As the solid fuel reacts with the gaseous oxygen of the unburned mixture of hydrogen and oxygen, the proportion of unreacted oxygen in the pocket decreases, until at some point the hydrogen component will combust. Thus, pockets of improperly mixed gaseous propellants within the combustion chamber will tend to be completely combusted due to the combustion of the solid fuel. Thus, the burning of the solid fuel tends to reduce instability in the burning of the oxygen and hydrogen propellants, notwithstanding that the mixture of the propellants may not be perfect, and thereby provides the potential for igniting unburned gases at any location along the length of the unburned solid fuel, due to the spontaneous reaction of the HTPB with any free oxygen. While the flow rate of the oxygen may be selected in conjunction with the flow rate of the hydrogen to provide stoichiometric combustion, the preferred flow rate of oxygen is one which is selected to provide enough excess oxygen to react with all, or substantially all, of the solid fuel by the time the fluid propellants are exhausted.

During operation of the engine of FIGURES 1a and 1b, the solid fuel 30 is burned by excess oxygen in the mass flow, and contributes to the thrust and $\Delta V$. At the same time, the presence of the unburned solid fuel 30 prevents excessive heating of the walls 18 of the combustion chamber of the engine.

The specific impulse of a hydrogen-oxygen rocket or thruster is in the vicinity of 420 seconds, while the specific impulse of the HTPB with oxygen is only about 320 seconds. Thus, maximizing the specific impulse ideally requires that the LH2/LO2 system be used exclusively or 100%. However, since the lowcost injector arrangement described in conjunction with a stage using the arrangement of FIGURES 1a and 1b may not sufficiently mix the oxygen and hydrogen, as described above, sufficient solid fuel must be provided to stabilize the combustion of that stage. While any proportion of solid fuel may be used, the preferred proportion is one in which fluid fuel provides at least 75% of the thrust, or provides at least 75% of the change in velocity ($\Delta V$), with the remainder of the thrust being provided by combustion of the solid fuel and any incidental ignition devices.

FIG. 2 illustrates a two-stage booster vehicle according to an aspect of the invention, for placing a payload into low Earth orbit. In FIG. 2, vehicle 200 includes an upper stage booster rocket 10 and a lower stage booster rocket 110, both of which correspond to the rocket engine 10 of FIGURES 1a and 1b. First stage 110 carries second stage 10 and a vehicle payload located in a region 129. Since first stage 110 is a solid/bipropellant liquid fuel hybrid, it requires a tank 112 of liquid oxygen (LO$_2$) and a tank 114 of liquid hydrogen (LH$_2$). The amount of oxidizer is selected, as described above, as being sufficient to react with the LH$_2$ and with the HTPB 130 of the first stage engine. Similarly, the second stage includes a tank 12 of liquid oxygen (LO$_2$) and a tank 14 of liquid hydrogen (LH$_2$), and of course a combustion chamber lined with solid fuel 30, all as described in conjunction with FIGURES 1a and 1b. Once the first stage propellant has been exhausted, the first stage is separated from the combination of second stage 10 with payload 129, and second stage 10 is ignited as described above. It should be noted that, since the invention is directed toward low cost to orbit, the specific impulse of the stages should be maximized. Thus, the amount of the total change in velocity ($\Delta V$) provided by the solid fuel portion must be kept to a relatively small amount, which is preferably as small as possible, taking into account the effectiveness of the mixing of the gaseous $O_2$ with the gaseous $H_2$ in the chamber. The exact amount of HTPB or other solid fuel will depend upon the energy content of the solid fuel and upon other factors known to those skilled in the art.

In a particular embodiment of the invention for boosting a payload of 200 pounds mass (lbm) with a fairing of 244 lbm into a circular low orbit of 100 nm ×100 nm @28.3°, the first stage is designed for a sea-level thrust or force of 14,004 lbf and 15,516 lbf at altitude, with a specific thrust (ISP) at sea level of 370 sec. and 410 sec. at altitude. The rate of change of mass (m) is 37.8 lbm/s. The combustion chamber pressure is 750 psi. The total first-stage mass at launch is 27111 lbm, and the force-to-weight ratio is 1.5. A burn time of 137 seconds is contemplated. The ratio of usable propellant to the weight of the stage is 0.82, and the propellant used is 5790 lbm.

The characteristics calculated for the second stage of the abovementioned embodiment include a force or thrust of 2222 lbf, ISP of 410 seconds, m of 5.4 lbm, F/W of 1.0, MF=0.83, burn time about 301 seconds, and usable propellant 1466 lbm.

Loosely speaking, a low-cost rocket or thruster according to the invention has a low-cost propellant injector, in which fluid fuel and oxidizer are injected into a combustion chamber. The walls of the combustion chamber are protected from the high temperatures of the combustion by a grain of solid propellant, the surface of which tends to melt andor vaporize in the presence of combustion temperatures, and thereby protects the walls of the chamber. The low-cost propellant injector may not mix the fluid fuel and oxidizer effectively, so that pockets of noncombusted gas may occur within the chamber. The ratio of fluid fuel and oxidizer is selected to be slightly oxidizer-rich, so that any pockets of unburned gas tend to be oxygen-rich. When the pockets come into contact with the solid fuel, the excess oxygen combusts with the gaseous solid fuel, and when the mixture is near stoichiometric, the fluid fuel combusts. Thus, an inexpensive bipropellant injector together with a solid fuel grain simultaneously allows use of solid fuel instead of insulation to protect the combustion chamber walls, and the combustion is stabilized by the presence of the solid fuel. Ideally, the amount of excess oxidizer should be sufficient to completely combust the solid fuel.

More particularly, a rocket engine (10) according to the invention includes a source (12) of liquid oxidizer and a source (14) of combustible fluid propellant. The engine (10) includes a chamber (16) with walls (18) and a combustion product ejection port (20), which may communicate with a thrust nozzle (22). A propellant injector (24) is coupled to the source of combustible fluid propellant (14), for injecting the propellant into the chamber (16) at a selected rate. An oxidizer injector (26) is coupled to the source of liquid oxidizer (12) and to the chamber (16), for injecting oxidizer into the chamber at a rate no less than a rate which is sufficient for complete combustion of the propellant. During operation of the rocket engine, the propellant tends to combust within the chamber (16) and to leave the chamber through the ejection port (20), for thereby creating thrust. The combustion may occur at a temperature sufficiently high that a wall or walls (18) of the chamber (16) may be damaged during operation of the rocket engine (10). The rocket engine includes a solid propellant liner (30) within the chamber (16). The surface (30s) of the solid propellant liner (30) which is adjacent the combustion tends to melt and then become gaseous in response to combustion of propellant in the chamber, thereby tending to absorb heat and to protect the wall (18) from high combustion temperatures. In the process of becoming gaseous, the solid propellant (30) combusts with any excess oxidizer which happens to be present, and adds to the thrust.

In a particular embodiment of the invention, the oxidizer supplied to the oxidizer injector (26) is liquid oxygen, the fluid propellant supplied to the fluid propellant injector (24) is liquid hydrogen, and the solid propellant is HTPB. According to an aspect of the invention, the location of the oxidizer and fluid propellant injectors is less critical than in the prior art, and the injectors are separate injectors which inject the oxidizer and fluid propellant at different locations about the chamber.

In an embodiment of the invention, the solid-propellant liner is in the form of an elongated cylinder defining an axis (8), and a cavity (30) extending along the axis. The cross-sectional shape of the cavity in a plane perpendicular to the longitudinal axis (8) may be generally star-shaped, or roughly circular with a plurality of lobes (34) extending toward the walls (18) of the chamber (16). In such an embodiment of the invention, the oxidizer is injected at a location lying on the longitudinal axis, and the fluid propellant is injected at a plurality of locations surrounding the location of the oxidizer injection, corresponding to the locations of the lobes in the cavity of the solid propellant.

A preferred method for operating a rocket engine according to the invention is to inject the fluid fuel at a selected rate, and to inject the oxidizer at a rate which exceeds the rate which provides complete combustion with the flux of fluid fuel, which then results in combustion of the solid propellant with the excess oxidizer.

Other embodiments of the invention will be apparent to those skilled in the art. For example, solid fuel other than HTPB can be used, and fuels and oxidizers other than hydrogen and oxygen can be used. All of the usual attitude and thrust controls, provisions for separating stages and the payload from the upper stage, and the like, may be used in the ordinary manner. Other types of igniters can be used, such as an electric arc or electric heater igniter, or a piezoelectric igniter, or a pyrophoric material can be injected into the combustion chamber to start the engine. While both the first and second stages of the arrangement of FIG. 2 are described as being hybrid rockets in accordance with the invention, any particular booster may include monopropellant, liquid bipropellant, and liquid/solid hybrid rockets in accordance with the invention, in any desired number of stages, and in any order.

What is claimed is:

1. A rocket engine, comprising:

a source of liquid oxidizer;

a source of combustible fluid propellant;

a chamber with walls, said chamber being coupled to a combustion product ejection port;

a propellant injector coupled to said source of combustible fluid propellant, for injecting said propellant into said chamber at a rate;

an oxidizer injector coupled to said source of liquid oxidizer and to said chamber, for injecting oxidizer into said chamber at a rate no less than a rate sufficient for complete combustion of said combustible fluid propellant, as a result of which said propellant combusts within said chamber to produce reaction products which leave said chamber through said ejection port, for thereby creating thrust; and a solid propellant liner within said chamber, said solid propellant liner becoming gaseous in response to combustion of propellant in said chamber, thereby combusting with any excess oxidizer to enhance said thrust;

said combustion of said fluid propellant with said oxidizer providing a greater proportion of said thrust than said combustion of said solid propellant with said excess oxidizer.

2. A rocket according to claim 1, wherein said oxidizer is oxygen.

3. A rocket according to claim 1, wherein said combustible fluid propellant is hydrogen.

4. A rocket according to claim 1, wherein said propellant and oxidizer injectors are located for injecting said fluid propellant and said oxidizer at spaced-apart locations within said chamber.

5. A rocket according to claim 1, wherein said oxidizer is oxygen, and said combustible fluid propellant is hydrogen.

6. A rocket according to claim 1, wherein said chamber is elongated, defines a longitudinal axis, and has a circular cross-section in a plane perpendicular to said longitudinal axis;

said solid propellant liner has a cylindrical exterior shape, a longitudinal axis substantially coincident with said longitudinal axis of said chamber, and also defines an axially-extending chamber into which said propellant and oxidizer injectors inject said propellant and said oxidizer.

7. A rocket according to claim 6, wherein said axially-extending chamber of said solid propellant liner has a cross-sectional shape, in a plane perpendicular to said longitudinal axis of said solid propellant liner, which includes at least one lobe extending toward said wall of said chamber.

8. A rocket according to claim 7, wherein said oxidizer injector injects said oxidizer at a location lying along said longitudinal axis of said solid propellant liner, and said fluid propellant injector injects said fluid propellant at a location generally within said lobe of said crosssectional shape of said solid propellant liner.

9. A rocket according to claim 8, wherein said cross-section of said solid propellant liner includes a plurality of lobes; and wherein said rocket further comprises a plurality of further fluid propellant injectors, each of which is located in one of said plurality of lobes.

10. A rocket according to claim 9, wherein said oxidizer is oxygen, and said fluid propellant is hydrogen.

11. A rocket according to claim 1, wherein said solid propellant is HTPB, protect said walls of said combustion chamber from the high temperatures of said combustion.

12. A rocket according to claim 1, wherein said solid propellant covers substantially all of the walls of said combustion chamber, for, by becoming gaseous, absorbing combustion heat to thereby protect said walls of said combustion chamber from the high temperatures of said combustion.

13. A method for operating a rocket engine which includes a combustible fluid propellant injector, a fluid oxidizer injector, and a combustion chamber lined with solid propellant, comprising the steps of:

injecting said fluid propellant into said chamber at a selected rate; and injecting said oxidizer into said chamber at a rate selected so that more oxidizer than is required to completely react with said fluid propellant enters said chamber, whereby said fluid propellant reacts with said oxidizer to produce thrust, and said solid propellant reacts with excess oxidizer to create additional thrust, and so that said combustion of said fluid propellant with said oxidizer provides a greater proportion of the thrust than said combustion of said solid propellant with said excess oxidizer.

14. A method according to claim 13, wherein said step of injecting said fluid oxidizer includes the step of injecting oxygen.

15. A method according to claim 13, wherein said step of injecting said fluid propellant includes the step of injecting hydrogen.

16. A multistage rocket, at least one stage of which comprises:

(a) a source of liquid oxidizer;

(b) a source of combustible fluid propellant;

(c) a chamber with walls, said chamber being coupled to a combustion product ejection port;

(d) a propellant injector coupled to said source of combustible fluid propellant, for injecting said propellant into said chamber at a rate;

(e) an oxidizer injector coupled to said source of liquid oxidizer and to said chamber, for injecting oxidizer into said chamber at a rate no less than a rate sufficient for complete combustion of said propellant, as a result of which said propellant combusts within said chamber and leaves said chamber through said ejection port, for thereby creating thrust, whereby said combustion occurs at a temperature sufficiently high to damage a wall of said chamber during operation of said rocket engine; and (f) a solid propellant liner within said chamber, said solid propellant liner becoming gaseous in response to combustion of propellant in said chamber, thereby absorbing heat and protecting said wall from said temperature, and in the process of becoming gaseous, combusting with any excess oxidizer to enhance said thrust in a lesser proportion of the total thrust than said thrust generated by combustion of said fluid propellant.

* * * * *